United States Patent [19]

Schliemann et al.

[11] Patent Number: 4,999,918
[45] Date of Patent: Mar. 19, 1991

[54] MOTOR CHAIN SAW HAVING A GUIDE BAR CLAMPED BETWEEN THE HOUSING AND A CLAMPING PIECE

[75] Inventors: Harald Schliemann, Waiblingen; Michael Wissmann, Schorndorf-Weiler, both of Fed. Rep. of Germany

[73] Assignee: Andreas Stihl, Waiblingen, Fed. Rep. of Germany

[21] Appl. No.: 448,620

[22] Filed: Dec. 11, 1989

[30] Foreign Application Priority Data

Dec. 23, 1988 [DE] Fed. Rep. of Germany ..... 38434598

[51] Int. Cl.$^5$ ...................... B23D 57/02; B23D 59/00
[52] U.S. Cl. ......................................... 30/386; 30/383
[58] Field of Search .................................. 30/383–387

[56] References Cited

U.S. PATENT DOCUMENTS 4,563,817 1/1986 Leighton ............................. 30/386

Primary Examiner—Douglas D. Watts
Attorney, Agent, or Firm—Walter Ottesen

[57] ABSTRACT

The invention relates to a motor chain saw having a guide bar clamped between the housing and a clamping piece. The chain saw has a drive motor arranged in a housing and the drive motor drives a saw chain running on a guide bar. The guide bar is clamped to the housing at one end between the housing and a clamping piece with the clamping being transverse to the plane of the guide bar. For tensioning the saw chain, the guide bar is displaceable in the longitudinal direction thereof by means of a chain tensioning device when the clamping piece is loosened. If high forces act on the guide bar, then the latter slips toward the sprocket wheel in the longitudinal direction notwithstanding the fact that the guide bar is clamped to the housing. Accordingly, the saw chain must be again tensioned by means of the chain tensioning device. According to a feature of the invention, at least one of the surfaces between the end of the guide bar and the housing or between the clamping piece is treated to increase friction whereby higher forces can act on the clamping connection for the same clamping force without effecting a displacement of the guide bar. It then becomes unnecessary to retension the saw chain while working with the chain saw.

17 Claims, 1 Drawing Sheet

MOTOR CHAIN SAW HAVING A GUIDE BAR CLAMPED BETWEEN THE HOUSING AND A CLAMPING PIECE

FIELD OF THE INVENTION

The invention relates to a motor chain saw having a housing on which a guide bar for the saw chain is mounted. The chain saw includes a clamping piece for clamping the guide bar to the housing and a chain tensioning device is provided for adjusting the tension in the chain when the clamping piece is loosened.

BACKGROUND OF THE INVENTION

The clamping piece must be clamped with considerable force with respect to the housing in order to apply a correspondingly large holding force to the end of the guide bar. In this connection, consideration must be given to the fact that substantial torques act on the rearward end of the guide bar because of the forces which act at the forward end of the guide bar and because of the length of the latter.

Experience has shown that even with relatively high bracing forces, the rearward end of the guide bar is displaced relative to the housing in the course of working with the chain saw which is accompanied by a relaxing of the tension in the saw chain. In order to obtain a reliable and safe handling of the chain saw, the work therewith must be interrupted often and the clamping piece loosened which is followed by a retensioning of the saw chain via the tensioning device. Thereafter, the clamping piece must again be screwed tight by applying correspondingly high forces so that the guide bar can be held in the newly adjusted position.

Especially for long guide bars, the forces acting on the guide bar act also on the chain tensioning device whereby the latter becomes greatly affected. The chain tensioning device is provided exclusively for developing the tensioning force and not for taking up high forces occurring during work with the chain saw. Experience in the field has shown that the chain tensioning device is greatly loaded and is often damaged or is rendered completely useless.

SUMMARY OF THE INVENTION

It is an object of the invention to provide a motor chain saw having a guide bar tightly clamped to the housing and configured so that the chain tensioning device provided for adjusting the tensioning force is not damaged by forces acting on the guide bar even when extended guide bars are mounted on the housing.

The motor chain saw of the invention is equipped with a drive motor and a saw chain. The chain saw includes: a housing for accommodating the drive motor therein; a guide bar having respective flat sides and a rearward end portion at which the guide bar is mounted on the housing; the guide bar defining a longitudinal axis and defining a guide path for guiding the saw chain in its movement around the guide bar; a sprocket wheel operatively connected to the drive motor for driving the saw chain; a clamping arrangement for clamping the guide bar to the motor housing, the clamping arrangement including a clamping piece for clamping the guide bar to the housing at the rearward end portion thereof; a first surface on the housing; second and third surfaces formed on respective ones of said flat sides at the end portion of the guide bar; and, a fourth surface formed on the clamping piece; the first and second surfaces conjointly defining an inner contact interface and the third and fourth surfaces conjointly an outer contact interface; and, releasable tightening means for applying a tightening force to the clamping piece and to the guide bar at the interfaces in a direction transverse to the plane; chain tensioning means for engaging the guide bar and displacing the latter in the direction of the axis for adjusting the tension in the saw chain when the tightening means is loosened; and, friction means formed on at least one of the surfaces for increasing the friction coefficient thereof.

A higher holding force for the guide bar is obtained for the same clamping force by treating at least one of the mutually engaging surfaces so as to increase the coefficient of friction whereby a relative displacement between the end of the guide bar and the housing of the chain saw in response to forces applied to the guide bar is avoided. It has been shown that a treatment of this kind for increasing the coefficient of friction reliably avoids damage to the chain tensioning device even for guide bars which are extremely long.

Pursuant to another embodiment of the invention, the surfaces facing each other are treated over their entire regions to increase the coefficient of friction whereby an almost form-tight engagement is obtained over a large segment in the longitudinal direction of the guide bar. The required holding force can be adapted in correspondence to the length of the guide bar in dependence upon the roughness of the surfaces treated for increasing the coefficient of friction without it being necessary to significantly increase the clamping force on the clamping piece.

Preferably, the guide bar is treated on both side surfaces so that a mounting surface having an increased friction coefficient faces the clamping surface on the housing of the motor chain saw whenever the guide bar is mounted. The clamping surface on the housing is preferably also treated to increase the coefficient of friction.

In a preferred embodiment of the invention, the treatment increasing the coefficient of friction is obtained by applying a layer increasing the coefficient of friction. This layer can be, for example, an oxide ceramic powder applied by plasma spraying.

In still another embodiment of the invention, the surface treated to increase the coefficient of friction is provided on an intermediate plate which is fixed to the housing of the motor chain saw, preferably with the aid of threaded fasteners. The intermediate plate is disposed between the rearward end of the guide bar and the housing with the surface treated for increasing the coefficient of friction facing the guide bar. With this cost saving solution, any desired guide bar can be used, even guide bars having side surfaces which are not treated to increase the coefficient of friction, without losing the advantageous effects of the invention.

In some applications, it is adequate to apply a layer of corundum paper as a layer providing an increased coefficient of friction.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
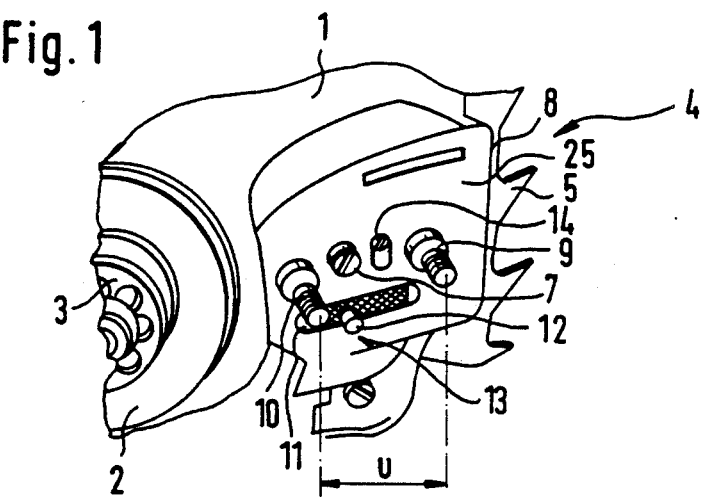
FIG. 1 is a perspective partial view of the motor housing of a chain saw in the area of the attachment surface for a guide bar; and, FIG. 2 is an enlarged section view taken through an end of the guide bar clamped to the housing.

A drive motor is mounted in the housing 1 of the motor chain saw shown in FIG. 1. The drive motor drives a sprocket wheel 3 via a clutch drum 2. An internal combustion engine such as a two-stroke engine is preferably provided as the drive motor. However, the arrangement of an electric motor can also be advantageous.

A clamping surface 25 is provided between the sprocket wheel 3 and the forward end 4 of the housing 1 having bumper spikes 5. The clamping surface 25 is defined by an intermediate plate 8 attached to the housing 1 by means of a screw 14. Two threaded studs 9 and 10 are threadably engaged in the housing and lie perpendicularly to the clamping surface 25. The threaded studs 9 and 10 are spaced a distance (u) from each other extending in the longitudinal direction of the housing 1. A slot 11 is provided in the side of the housing beneath the studs 9 and 10 and a pin 12 of a chain tensioning device 13 extends through this slot 11 in a direction perpendicular to the clamping surface 25. A chain saw tensioning device of this kind is disclosed in U.S. Pat. No. 4,567,658 incorporated herein by reference. The chain tensioning device 13 is displaced by means of a tensioning screw 7 with the pin 12 being displaced along the slot 11.

Figure 2:
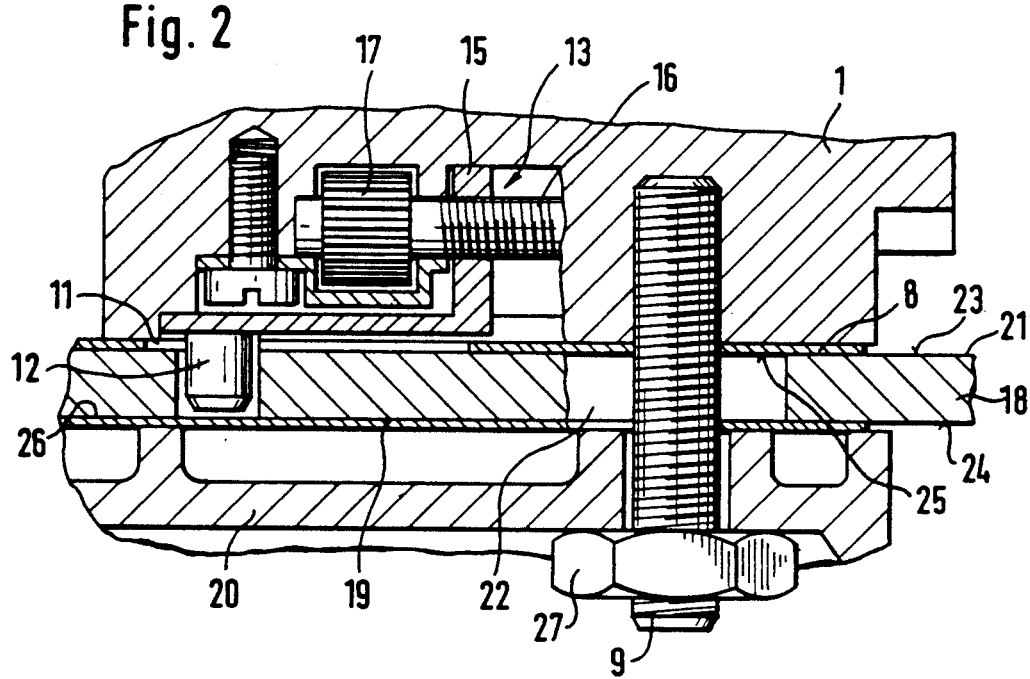

As shown in FIG. 2, the chain tensioning device 13 is provided in housing 1 of the motor chain saw. The pin 12 is attached to an L-shaped slider having a flange 15 disposed perpendicularly to the clamping surface 25 and which is seated on a threaded shaft 16. The threaded shaft 16 can be driven via an actuating screw 7 and a gear wheel 17.

A clamping piece 20 is held by means of the studs (9, 10) and lies opposite the clamping surface 25 or the intermediate plate 8 fixedly attached to the housing. An intermediate plate 19 is likewise attached to the clamping piece 20.

An end 18 of the guide bar 21 is clamped transversely to its plane between the intermediate plates or between the housing 1 and the clamping piece 20. The pin 12 of the chain tensioning device 13 then engages in a corresponding opening 18a in the end 18 of the guide bar while the studs (9, 10) extend through the slots 22 of the guide bar end 18 which are configured in correspondence to the adjusting path of the chain tensioning device 13.

Nuts 27 are threadably mounted on studs (9, 10) and clamp the guide bar end 18 between the clamping piece 20 and the housing 1 transversely to the plane of the guide bar. At least one of the surfaces (23, 24, 25, 26) lying one on top of the other in the clamping region is configured to increase the coefficient of friction. In this way, a high clamping action is obtained. Accordingly, the guide bar 21 can be treated to increase the coefficient of friction on its clamped-in end 18 on the side surface 23 facing toward the clamping surface 25 on the housing 1. It is advantageous to also treat the clamping surface 25 on the housing so as to increase the coefficient of friction thereby increasing the frictional engagement.

In a further embodiment of the invention, the side surface 24 of the guide bar end 18 as well as the clamping surface 26 of the clamping piece 20 are treated to increase the coefficient of friction.

If only the clamping surface 25 on the housing 1 is configured so as to increase the coefficient of friction, then the end 18 of the guide bar is treated at both side surfaces 23 and 24 to increase the coefficient of friction. In this way, the guide bar 21 can, in both assembly positions, be connected to the clamping surface 25 of the housing so as to establish a friction transmitting connection.

In a preferred embodiment of the invention, the clamping surface 25 lying on the side of the housing 1 is provided at the intermediate plate 8 and treated so as to increase the coefficient of friction. The intermediate plate 8 is preferably fixedly attached to the housing 1 by screws 14 in such a manner that the friction-treated clamping surface 25 faces the end 18 of the guide bar at the intermediate plate and the untreated side surface 24 of the guide bar 18 lies on the opposite side. The side surface 24 is pressed against the clamping surface 25 perpendicular to the plane of the guide bar by the clamping piece 20. The friction-increased layer of the clamping surface 25 reliably provides a high clamping effect at low clamping force. A layer of this kind can comprise glued-on corundum paper; however, the layer is preferably a layer made of oxide ceramic powder applied by means of a plasma spray process.

When using the intermediate plates 8 or 19, the friction-increasing layer can be provided by means of an intermediate plate having a milled surface and consisting preferably of steel sheet metal. It can be advantageous to provide the side surface 24 of the guide bar end 18 or both its side surfaces with a milled surface to increase friction.

If a friction-increasing surface is provided on the intermediate plate as well as on the guide bar, then this is preferably obtained with the same friction-increasing treatment.

It is understood that the foregoing description is that of the preferred embodiments of the invention and that various changes and modifications may be made thereto without departing from the spirit and scope of the invention as defined in the appended claims.

What is claimed is:

1. A motor chain saw equipped with a drive motor and a saw chain, the chain saw comprising:
    a housing for accommodating the drive motor therein;
    a guide bar having respective flat sides and a rearward end portion at which said guide bar is mounted on said housing;
    said guide bar defining a longitudinal axis and defining a guide path for guiding the saw chain in its movement around the guide bar;
    a sprocket wheel operatively connected to said drive motor for driving the saw chain;
    a clamping arrangement for clamping the guide bar to the motor housing, the clamping arrangement including a clamping piece for clamping said guide bar to said housing at said rearward end portion thereof; a first surface on said housing; second and third surfaces formed on respective ones of said flat sides at said end portion; and, a fourth surface formed on said clamping piece; said first and second surfaces conjointly defining an inner contact interface and said third and fourth surfaces conjointly defining an outer contact interface; and, releasable tightening means for applying a tightening force to said clamping piece and to said guide bar at said interfaces in a direction transverse to said plane;

chain tensioning means for engaging said guide bar and displacing the latter in the direction of said axis for adjusting the tension in the saw chain when said tightening means is loosened; and, friction means formed on at least one of said surfaces for increasing the friction coefficient thereof.

2. A motor chain saw equipped with a drive motor and a saw chain, the chain saw comprising:

a housing for accommodating the drive motor therein;

a guide bar having respective flat sides and a rearward end portion at which said guide bar is mounted on said housing;

said guide bar defining a longitudinal axis and defining a guide path for guiding the saw chain in its movement around the guide bar;

a sprocket wheel operatively connected to said drive motor for driving the saw chain;

a clamping arrangement for clamping the guide bar to the motor housing, the clamping arrangement including a clamping piece for clamping said guide bar to said housing at said rearward end portion thereof; a first surface on said housing; second and third surfaces formed on respective ones of said flat sides at said end portion; and, a fourth surface formed on said clamping piece; said first and second surfaces conjointly defining an inner contact interface and said third and fourth surfaces conjointly defining an outer contact interface; and, releasable tightening means for applying a tightening force to said clamping piece and to said guide bar at said interfaces in a direction transverse to said plane;

chain tensioning means for engaging said guide bar and displacing the latter in the direction of said axis for adjusting the tension in the saw chain when said tightening means is loosened;

friction means formed on at least one of said surfaces for increasing the friction coefficient thereof;

said one surface being in contact engagement with another one of said surfaces;

said friction means being also formed on said other one of said surfaces; and, said one surface and said other surface conjointly defining a surface pair of increased friction coefficient.

3. A motor chain saw equipped with a drive motor and a saw chain, the chain saw comprising:

a housing for accommodating the drive motor therein;

a guide bar having respective flat sides and a rearward end portion at which said guide bar is mounted on said housing;

said guide bar defining a longitudinal axis and defining a guide path for guiding the saw chain in its movement around the guide bar;

a sprocket wheel operatively connected to said drive motor for driving the saw chain;

a clamping arrangement for clamping the guide bar to the motor housing, the clamping arrangement including a clamping piece for clamping said guide bar to said housing at said rearward end portion thereof; a first surface on said housing; second and third surfaces formed on respective ones of said flat sides at said end portion; and, a fourth surface formed on said clamping piece; said first and second surfaces conjointly defining an inner contact interface and said third and fourth surfaces conjointly defining an outer contact interface; and, releasable tightening means for applying a tightening force to said clamping piece and to said guide bar at said interfaces in a direction transverse to said plane;

chain tensioning means for engaging said guide bar and displacing the latter in the direction of said axis for adjusting the tension in the saw chain when said tightening means is loosened;

friction means formed on at least one of said surfaces for increasing the friction coefficient thereof; and, said friction means being formed on said second and third surfaces.

4. A motor chain saw equipped with a drive motor and a saw chain, the chain saw comprising:

a housing for accommodating the drive motor therein;

a guide bar having respective flat sides and a rearward end portion at which said guide bar is mounted on said housing;

said guide bar defining a longitudinal axis and defining a guide path for guiding the saw chain in its movement around the guide bar;

a sprocket wheel operatively connected to said drive motor for driving the saw chain;

a clamping arrangement for clamping the guide bar to the motor housing, the clamping arrangement including a clamping piece for clamping said guide bar to said housing at said rearward end portion thereof; a first surface on said housing; second and third surfaces formed on respective ones of said flat sides at said end portion; and, a fourth surface formed on said clamping piece; said first and second surfaces conjointly defining an inner contact interface and said third and fourth surfaces conjointly defining an outer contact interface; and, releasable tightening means for applying a tightening force to said clamping piece and to said guide bar at said interfaces in a direction transverse to said plane;

chain tensioning means for engaging said guide bar and displacing the latter in the direction of said axis for adjusting the tension in the saw chain when said tightening means is loosened;

friction means formed on at least one of said surfaces for increasing the friction coefficient thereof; and, said friction means being formed on all of said surfaces so as to extend over the entire region of said rearward end portion.

5. A motor chain saw equipped with a drive motor and a saw chain, the chain saw comprising:

a housing for accommodating the drive motor therein;

a guide bar having respective flat sides and a rearward end portion at which said guide bar is mounted on said housing;

said guide bar defining a longitudinal axis and defining a guide path for guiding the saw chain in its movement around the guide bar;

a sprocket wheel operatively connected to said drive motor for driving the saw chain;

a clamping arrangement for clamping the guide bar to the motor housing, the clamping arrangement including a clamping piece for clamping said guide bar to said housing at said rearward end portion thereof; a first surface on said housing; second and third surfaces formed on respective ones of said flat sides at said end portion; and, a fourth surface formed on said clamping piece; said first and second surfaces conjointly defining an inner contact interface and said third and fourth surfaces conjointly defining an outer contact interface; and, releasable tightening means for applying a tightening force to said clamping piece and to said guide bar at said interfaces in a direction transverse to said plane;

chain tensioning means for engaging said guide bar and displacing the latter in the direction of said axis for adjusting the tension in the saw chain when said tightening means is loosened;

friction means formed on at least one of said surfaces for increasing the friction coefficient thereof; and, said friction means being applied to only said first surface.

6. The motor chain saw of claim 1, said friction means including a layer of increased coefficient of friction applied to said one surface.

7. A motor chain saw equipped with a drive motor and a saw chain, the chain saw comprising:
- a housing for accommodating the drive motor therein;
- a guide bar having respective flat sides and a rearward end portion at which said guide bar is mounted on said housing;
- said guide bar defining a longitudinal axis and defining a guide path for guiding the saw chain in its movement around the guide bar;
- a sprocket wheel operatively connected to said drive motor for driving the saw chain;
- a clamping arrangement for clamping the guide bar to the motor housing, the clamping arrangement including a clamping piece for clamping said guide bar to said housing at said rearward end portion thereof; a first surface on said housing; second and third surfaces formed on respective ones of said flat sides at said end portion; and, a fourth surface formed on said clamping piece; said first and second surfaces conjointly defining an inner contact interface and said third and fourth surfaces conjointly defining an outer contact interface; and, releasable tightening means for applying a tightening force to said clamping piece and to said guide bar at said interfaces in a direction transverse to said plane;
- chain tensioning means for engaging said guide bar and displacing the latter in the direction of said axis for adjusting the tension in the saw chain when said tightening means is loosened;
- friction means formed on at least one of said surfaces for increasing the friction coefficient thereof;
- said friction means including a layer of increased coefficient of friction applied to said one surface; and,
- said layer being an oxide ceramic powder applied by means of a plasma spray process.

8. A motor chain saw equipped with a drive motor and a saw chain, the chain saw comprising:
- a housing for accommodating the drive motor therein;
- a guide bar having respective flat sides and a rearward end portion at which said guide bar is mounted on said housing;
- said guide bar defining a longitudinal axis and defining a guide path for guiding the saw chain in its movement around the guide bar;
- a sprocket wheel operatively connected to said drive motor for driving the saw chain;
- a clamping arrangement for clamping the guide bar to the motor housing, the clamping arrangement including a clamping piece for clamping said guide bar to said housing at said rearward end portion thereof; a first surface on said housing; second and third surfaces formed on respective ones of said flat sides at said end portion; and, a fourth surface formed on said clamping piece; said first and second surfaces conjointly defining an inner contact interface and said third and fourth surfaces conjointly defining an outer contact interface; and, releasable tightening means for applying a tightening force to said clamping piece and to said guide bar at said interfaces in a direction transverse to said plane;
- chain tensioning means for engaging said guide bar and displacing the latter in the direction of said axis for adjusting the tension in the saw chain when said tightening means is loosened;
- friction means formed on at least one of said surfaces for increasing the friction coefficient thereof;
- said friction means including a layer of increased coefficient of friction applied to said one surface; and,
- said layer being corundum paper attached to said one surface by an adhesive.

9. A motor chain saw equipped with a drive motor and a saw chain, the chain saw comprising:
- a housing for accommodating the drive motor therein;
- a guide bar having respective flat sides and a rearward end portion at which said guide bar is mounted on said housing;
- said guide bar defining a longitudinal axis and defining a guide path for guiding the saw chain in its movement around the guide bar;
- a sprocket wheel operatively connected to said drive motor for driving the saw chain;
- a clamping arrangement for clamping the guide bar to the motor housing, the clamping arrangement including a clamping piece for clamping said guide bar to said housing at said rearward end portion thereof; a first surface on said housing; second and third surfaces formed on respective ones of said flat sides at said end portion; and, a fourth surface formed on said clamping piece; said first and second surfaces conjointly defining an inner contact interface and said third and fourth surfaces conjointly defining an outer contact interface; and, releasable tightening means for applying a tightening force to said clamping piece and to said guide bar at said interfaces in a direction transverse to said plane;
- chain tensioning means for engaging said guide bar and displacing the latter in the direction of said axis for adjusting the tension in the saw chain when said tightening means is loosened;
- friction means formed on at least one of said surfaces for increasing the friction coefficient thereof;
- said clamping arrangement including an intermediate plate disposed at one of said interfaces and having two flat surfaces; and, said friction means being formed on at least one of said flat surfaces of said plate.

10. The motor chain saw of claim 9, said intermediate plate being disposed at said inner contact interface; and, said clamping arrangement including threaded fasteners for mounting said intermediate plate on said first surface.

11. The motor chain saw of claim 10, one of said flat surfaces of said plate being in contact engagement with said second surface; and, said friction means being formed in the same manner on said one flat surface of said plate and on said second surface.

12. The motor chain saw of claim 9, said friction means being formed on said one flat surface of said intermediate plate by milling.

13. A motor chain saw equipped with a drive motor and a saw chain, the chain saw comprising:
- a housing for accommodating the drive motor therein;
- a guide bar having respective flat sides and a rearward end portion at which said guide bar is mounted on said housing;
- said guide bar defining a longitudinal axis and defining a guide path for guiding the saw chain in its movement around the guide bar;
- a sprocket wheel operatively connected to said drive motor for driving the saw chain;
- a clamping arrangement for clamping the guide bar to the motor housing, the clamping arrangement including a clamping piece for clamping said guide bar to said housing at said rearward end portion thereof; a first surface on said housing; second and third surfaces formed on respective ones of said flat sides at said end portion; and, a fourth surface formed on said clamping piece; said first and second surfaces conjointly defining an inner contact interface and said third and fourth surfaces conjointly defining an outer contact interface; and, releasable tightening means for applying a tightening force to said clamping piece and to said guide bar at said interfaces in a direction transverse to said plane;
- chain tensioning means for engaging said guide bar and displacing the latter in the direction of said axis for adjusting the tension in the saw chain when said tightening means is loosened;
- friction means formed on at least one of said surfaces for increasing the friction coefficient thereof; and,
- said friction means being formed on said second and third surfaces by milling.

14. A motor chain saw equipped with a drive motor and a saw chain, the chain saw comprising:
- a housing for accommodating the drive motor therein;
- a guide bar having respective flat sides and a rearward end portion at which said guide bar is mounted on said housing;
- said guide bar defining a longitudinal axis and defining a guide path for guiding the saw chain in its movement around the guide bar;
- a sprocket wheel operatively connected to said drive motor for driving the saw chain;
- a clamping arrangement for clamping the guide bar to the motor housing, the clamping arrangement including a clamping piece for clamping said guide bar to said housing at said rearward end portion thereof; a first surface on said housing; second and third surfaces formed on respective ones of said flat sides at said end portion; and, a fourth surface formed on said clamping piece; said first and second surfaces conjointly defining an inner contact interface and said third and fourth surfaces conjointly defining an outer contact interface; and, releasable tightening means for applying a tightening force to said clamping piece and to said guide bar at said interfaces in a direction transverse to said plane;
- chain tensioning means for engaging said guide bar and displacing the latter in the direction of said axis for adjusting the tension in the saw chain when said tightening means is loosened;
- friction means formed on at least one of said surfaces for increasing the friction coefficient thereof;
- said clamping arrangement including two intermediate plates disposed at corresponding ones of said interfaces;
- each of said plate having two flat surfaces; and,
- said friction means being formed on at least one of said flat surfaces of each of said plates.

15. The motor chain saw of claim 14, one of said intermediate plates being disposed at said inner contact interface; and, said clamping arrangement including threaded fasteners for mounting said one intermediate plate on said first surface.

16. The motor chain saw of claim 14, one of said flat surfaces of each of said plates being in contact engagement with said second and third surfaces, respectively; and, said friction means being formed in the same manner on said one of said flat surfaces of each of said plates and on said second and third surfaces.

17. The motor chain saw of claim 14, said friction means being formed on said one flat surface of each of said intermediate plates by milling.

* * * * *